United States Patent [19]

Fujioka

[11] Patent Number: 5,896,325
[45] Date of Patent: *Apr. 20, 1999

[54] IC CARD WITH ERROR PROCESSING UNIT FOR SENSE AMPLIFIERS

[75] Inventor: Shuzo Fujioka, Hyogo, Japan

[73] Assignees: Mitsubishi Denki Kabushiki Kaisha, Tokyo; Mitsubishi Electric Semiconductor Software Co., Ltd., Hyogo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/962,839

[22] Filed: Nov. 3, 1997

[30] Foreign Application Priority Data

May 8, 1997 [JP] Japan ................... 9-118094

[51] Int. Cl.$^6$ .................................................. G11C 7/00
[52] U.S. Cl. ................. 365/189.07; 365/195; 365/205
[58] Field of Search ............... 365/189.07, 189.01, 365/195, 205, 207, 208; 380/23, 24

[56] References Cited

U.S. PATENT DOCUMENTS

| 5,539,825 | 7/1996 | Akiyama et al. ........................ 380/24 |
| 5,577,000 | 11/1996 | Asami ................................... 365/205 |

FOREIGN PATENT DOCUMENTS

| 877787 | 3/1996 | Japan . |
| 8190799 | 7/1996 | Japan . |

*Primary Examiner*—Vu A. Le
*Attorney, Agent, or Firm*—Leydig, Voit & Mayer

[57] ABSTRACT

An IC card having a memory for receiving data from and sending data to a data reader/writer includes a reading-completion detection circuit for detecting if each sense amplifier in the IC card has completed data reading from the memory and a control circuit which ignores a command sent from the data reader/writer when no reading completion detection signal is output from the data reading-completion detection circuit upon verifying a password sent from the data reader/writer.

7 Claims, 8 Drawing Sheets

IC CARD WITH ERROR PROCESSING UNIT FOR SENSE AMPLIFIERS

BACKGROUND OF THE INVENTION

The present invention relates to an IC card for exchanging data with a data reading and writing device.

There are two types of IC cards for exchanging data with a data reading and writing device: contact cards, which exchange data through an electrical connection with the data reading and writing device, and contactless cards, which use radio frequency (RF) signals or other non-contact media to exchange data with the data reading and writing device. FIG. 7 is a block diagram of an exemplary conventional contactless IC card.

As shown in FIG. 7, this noncontact IC card 100 (simply IC card below) communicates with a data reading and writing device (reader/writer) 101 via an antenna circuit 102 enabling RF communications, and a modulation/demodulation circuit 103 for demodulating received data and modulating data for sending. An input/output (I/O) circuit 104 converts serial data to parallel data, and parallel data to serial data. The memory unit 107 of the IC card 100 comprises a sense amplifier unit 106, and non-volatile memory 105 such as an EEPROM unit. A control circuit 108 controls the operation of the I/O circuit 104 and memory unit 107, and an internal power supply circuit 109 rectifies the RF signal received by the antenna circuit 102 to supply power to the other internal circuit components. A bus 110 connects the I/O circuit 104, memory unit 107, and control circuit 108.

FIG. 8 is a circuit diagram of a sense amplifier used in the sense amplifier unit 106, and is described in detail in Japanese Patent Application HEI 7-1304 (1995–1304) filed by the inventors of the present invention. What is important to note here is that the speed of charging the parasitic capacitance 123 of the bit line 122 connected to the memory cell 121 of the non-volatile memory 105 is different when a charge is stored or is not stored in the memory cell 121.

A capacitor 124 with a specific capacitance is therefore provided to detect the presence of a charge stored in the memory cell 121 by comparing the charging rate of the parasitic capacitance 123 and the capacitor 124 to the current flowing from nMOS transistors 126 and 127 of the current supply unit 125 during reading. More specifically, the capacitor 124 is used to detect and read the binary level of the data stored in the memory cell 121 during reading. It should be noted that when the non-volatile memory 105 has an 8-bit structure, the sense amplifier unit 106 has eight of the sense amplifier circuits shown in FIG. 8, one sense amplifier circuit corresponding to each bit, and that just one of these is shown in FIG. 8.

When the non-volatile memory 105 of this IC card 100 is accessed by a reader/writer 101, the control circuit 108 compares the password input from the reader/writer 101 with the password previously stored in the non-volatile memory 105. When the passwords match, the control circuit 108 permits access to the non-volatile memory 105 according to the commands input from the reader/writer 101. When the passwords do not match, however, the control circuit 108 prohibits access to the non-volatile memory 105, and implements a particular error processing routine. As a result, the reader/writer 101 cannot access the non-volatile memory 105 if the passwords do not match.

The operating voltage range of the sense amplifier unit 106, however, is narrower than that of the other circuit components. More specifically, the lowest operating voltage of the sense amplifier unit 106 is higher than that of the other circuit components. This means that if the supply voltage from the internal power supply circuit 109 drops, the sense amplifier unit 106 may stop operating while the other components continue to operate. The output from the sense amplifier unit 106 in this case will be HIGH, and, if the non-volatile memory 105 has an 8-bit structure, the output of each sense amplifier circuit in the sense amplifier unit 106 will be HIGH.

If a password from the reader/writer 101 is checked while the sense amplifier unit 106 is in this non-operating state, the password will be verified (FF) a determination of whether or not the password matches the password stored in the non-volatile memory 105, because all outputs from the sense amplifier unit 106 are HIGH.

The power source of the IC card 100 is derived by rectification of the RF signal from an external source by the internal power supply circuit 109. As a result, the internal supply voltage of the IC card can be easily changed by simply moving the IC card 100 closer to or away from the reader/writer 101. This means that if the IC card 100 is moved to a position lowering the supply voltage to a level at which only the sense amplifier unit 106 stops operating, password verification is then completed with a potentially false verification (FF). When the IC card 100 is then moved to a position at which the supply voltage is again raised to a level at which the sense amplifier unit 106 operates, the non-volatile memory 105 can be accessed even though the password has not been properly verified. This obviously means that it is possible to access the non-volatile memory 105 even without knowing the correct password, and data security cannot, therefore, be assured.

This problem is not unique to contactless IC cards. The same type of problem also occurs in contact IC cards when the supply voltage to the IC card is dropped to a level at which only the sense amplifier unit of the memory unit does not operate.

Therefore, an object of the present invention is to provide an IC card resolving the above problem by preventing data access when the password is not confirmed to have been properly verified, and, thereby, improving the security of the data stored in memory.

SUMMARY OF THE INVENTION

To achieve the above object, an IC card according to the present invention for exchanging data with a data reading and writing device comprises an interface unit for interfacing with the data reading and writing device, a memory unit comprising a plurality of memory cells for storing a particular password, a sense amplifier unit for reading data from a selected memory cell in the memory unit, a reading-completion detection unit for detecting if the sense amplifier unit has completed reading data from the memory unit, and outputting a reading-completed signal indicating that reading has been completed when the completion of data reading is detected, and a controller for controlling the operation of the memory unit and sense amplifier unit according to a command input from the data reading and writing device through the interface unit. The controller ignores the command from the data reading and writing device and executes a particular error process when a password reading-completed signal is not output from the reading-completion detection unit during verification of the password output with the command from the data reading and writing device against a password stored to the memory unit.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become more fully understood from the detailed description given below and the accompanying diagrams wherein.

DETAILED DESCRIPTION OF PREFERRED EMBODIMENTS

The preferred embodiments of the present invention are described below with reference to the accompanying drawings.

EMBODIMENT 1

Figure 1:
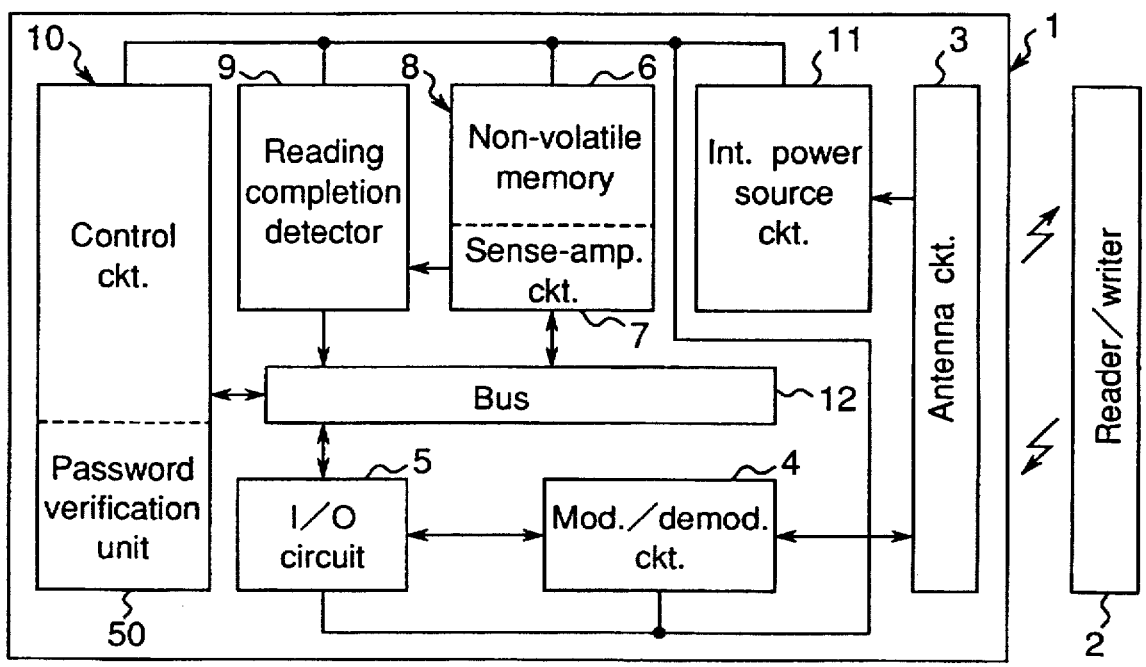
FIG. 1 is a block diagram of an IC card according to a first embodiment of the present invention.

FIG. 1 is a block diagram of an IC card exemplary of the first embodiment of the present invention and comprised as described below.

As shown in FIG. 1, the IC card of the invention is a contactless IC card, but is referred to below as simply an IC card 1. This IC card 1 communicates with a data reading and writing device (reader/writer) 2 via an antenna circuit 3 enabling RF communications, and a modulation/demodulation (modem) circuit 4 for demodulating received data and modulating data for sending. An input/output (I/O) circuit 5 converts serial data to parallel data, and parallel data to serial data. The memory unit 8 of the IC card 1 comprises a sense amplifier unit 7, and non-volatile memory 6 such as an EEPROM unit.

A reading-completion detector 9 detects whether the sense amplifier unit 7 has finished reading from the non-volatile memory 6. A control circuit 10 controls the operation of the I/O circuit 5 and memory unit 8, and an internal power supply circuit 11 rectifies the RF signal received by the antenna circuit 3 to supply power to the other internal circuit components. A bus 12 connects the I/O circuit 5, memory unit 8, reading-completion detector 9, and control circuit 10.

The antenna circuit 3, modem circuit 4, and I/O circuit 5 function as an interface unit, and the non-volatile memory 6 provides data storage.

The antenna circuit 3 is connected to the modem circuit 4 and the internal power supply circuit 11, and the modem circuit 4 is connected to the I/O circuit 5. The I/O circuit 5, memory unit 8, reading-completion detector 9, and control circuit 10 are connected via the bus 12. The internal power supply circuit 11 is connected to the modem circuit 4, I/O circuit 5, memory unit 8, reading-completion detector 9, and control circuit 10.

The reader/writer 2 with which this IC card 1 is used constantly outputs an RF signal which is received by the antenna circuit 3. The antenna circuit 3 then converts the RF signal to an electrical signal, output to the modem circuit 4 and internal power supply circuit 11. The internal power supply circuit 11 rectifies the received electrical signal to supply power to the other circuit components of the IC card 1.

When the reader/writer 2 is not sending data to the IC card 1, it transmits an unmodulated RF signal. When data is transmitted, the reader/writer 2 transmits an RF signal containing the data modulating to a carrier wave.

When data is thus transmitted from the reader/writer 2 to the IC card 1, the modem circuit 4 demodulates the electrical signal input from the antenna circuit 3 to extract the data. The extracted data is then output to the I/O circuit 5.

The I/O circuit 5 converts the serial data from the modem circuit 4 to parallel data, and outputs the parallel data to the bus 12.

The control circuit 10 operates according to the commands received from the reader/writer 2, and thus controls operation of the memory unit 8.

When data stored in the memory unit 8 is transmitted to the reader/writer 2, the control circuit 10 implements a read operation to retrieve the desired data from the memory unit 8, and passes the read data through the bus 12 to the I/O circuit 5 as parallel data. The I/O circuit 5 then converts this parallel data to serial data, and outputs the serial data to the modem circuit 4.

The modem circuit 4 thus uses the serial data from the I/O circuit 5 to modulate a carrier wave, and outputs the modulated signal to the antenna circuit 3. The antenna circuit 3 then converts the modulated data signal to an RF signal, and transmits the RF signal to the reader/writer 2.

Figure 2:
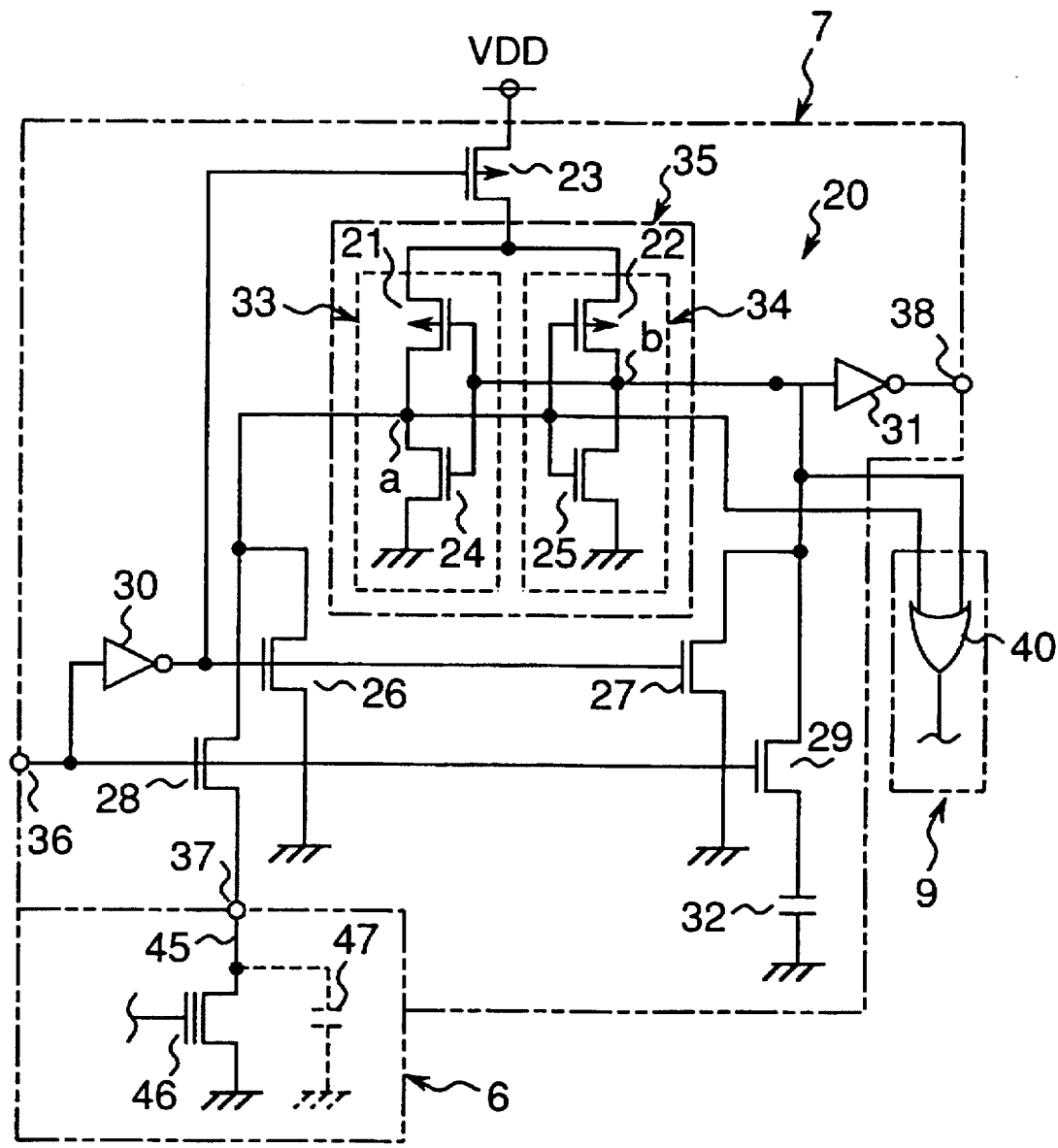
FIG. 2 is a simple circuit diagram of the sense amplifier unit and reading-completion detector shown in FIG. 1.

FIG. 2 is a circuit diagram of a sense amplifier unit 7 and reading-completion detector 9 exemplary of the present invention. Note that only one of the plural sense amplifiers is shown in FIG. 2. As shown in FIG. 2, the sense amplifier unit 7 has a sense amplifier 20 comprising p-channel MOS transistors (pMOS transistors) 21 to 23, n-channel MOS transistors (nMOS transistors) 24 to 29, inverters 30 and 31, and capacitor 32.

The reading-completion detector 9 has a two-input NOR gate for each sense amplifier of the sense amplifier unit 7. Shown in FIG. 2 is the two-input NOR gate 40 corresponding to the shown sense amplifier 20.

In the sense amplifier 20, pMOS transistor 21 and nMOS transistor 24 form an inverter 33, and pMOS transistor 22 and nMOS transistor 25 form an inverter 34.

The drains of pMOS transistor 21 and nMOS transistor 24 are connected to form the output of the inverter 33, the gates of pMOS transistor 21 and nMOS transistor 24 are connected to form the inverter input, and the source of the nMOS transistor 24 is grounded.

The drains of pMOS transistor 22 and nMOS transistor 25 are likewise connected to form the output of the inverter 34, the gates are connected to form the inverter input, and the source of the nMOS transistor 25 is grounded.

The output of the inverter 33 is connected to the input of the inverter 34 at a point a, and the input of inverter 33 is connected to the output of inverter 34 at a point b. The inverters 33 and 34 thus form a differential amplifier 35.

The sources of pMOS transistors 21 and 22 are connected to the drain of pMOS transistor 23, and the source of pMOS transistor 23 is connected to the power supply terminal VDD. A drive signal input terminal 36 from which a HIGH signal is input from the control circuit 10 during data reading is connected to the gates of pMOS transistor 23 and nMOS transistors 26 and 27 by the inverter 30, and to the gates of nMOS transistors 28 and 29.

The drains of nMOS transistors 26 and 28 are connected to point a, and the source of nMOS transistor 26 is grounded. The source of nMOS transistor 28 is connected to the bit line 45 of the non-volatile memory 6 through a data input terminal 37. A plurality of memory cells of the EEPROM are connected to the bit line 45 of the non-volatile memory 6, but only one memory cell 46 is shown in FIG. 2 by way of example. The drain of the memory cell 46 is connected to the bit line 45, and the source is grounded. A parasitic capacitance 47 is also connected to the bit line 45.

The drains of nMOS transistors 27 and 29 are connected to point b, the source of nMOS transistor 27 is directly grounded, and the source of nMOS transistor 29 is grounded through capacitor 32.

One input to NOR gate 40 of the reading-completion detector 9 is connected to point a, the other input to NOR gate 40 is connected to point b. Connection b is also connected to the input of inverter 31. The output of inverter 31 is connected to output terminal 38, which functions as the output terminal of the sense amplifier 20 and the sense amplifier unit 7.

Note that nMOS transistors 28 and 29 function as a current supply unit.

The operation of the sense amplifier unit 7 is described next below.

When the control circuit 10 does not drive the sense amplifier unit 7, it outputs a LOW signal to drive signal input terminal 36. pMOS transistor 23 thus turns off, and nMOS transistors 26 and 27 turn on, and a LOW signal state thus occurs at both connection points a and b. The output of NOR gate 40 in the reading-completion detector 9 is thus LOW.

When a HIGH signal is then applied to the drive signal input terminal 36, nMOS transistors 26 and 27 turn off, and a floating state occurs at connection points a and b. pMOS transistor 23 and nMOS transistors 28 and 29 also go on, causing pMOS transistors 21 and 22 to turn on and charging of capacitor 32 and parasitic capacitance 47 to start.

When a charge is held in the floating gate of memory cell 46, i.e., when a LOW data value is stored in the memory cell 46, memory cell current Ie flows to the selected memory cell 46 connected to the data input terminal 37, and memory cell 46 is thus conductive. Charging of capacitor 32 is thus faster than charging of parasitic capacitance 47, and a HIGH level occurs first at connection point b when charging of the capacitor 32 is completed. As a result, pMOS transistor 21 turns off and nMOS transistor 24 turns on.

This fixes connection point a LOW, turning pMOS transistor 22 on and nMOS transistor 25 off. Connection point b is fixed HIGH. When point a is held LOW at the same time point b is held HIGH, the output of the NOR gate 40 in the reading-completion detector 9 is HIGH, and output terminal 38 is LOW.

When a charge is not stored in the floating gate of the memory cell 46, i.e., when a HIGH data value is stored in the memory cell 46, memory cell current Ie does not flow to the selected memory cell 46 connected to the data input terminal 37, and memory cell 46 is thus non-conducting. The capacitance of capacitor 32 is also greater than the capacitance of the parasitic capacitance 47. Charging of parasitic capacitance 47 is thus faster than charging of capacitor 32, and a HIGH level occurs first at connection point a when charging of the parasitic capacitance 47 is completed. As a result, pMOS transistor 22 turns off and nMOS transistor 25 turns on.

This fixes connection point b LOW, turning pMOS transistor 21 on and nMOS transistor 24 off. Connection point a is fixed HIGH. When point a is held HIGH at the same time point b is held LOW, the output of the NOR gate 40 in the reading-completion detector 9 is HIGH, and output terminal 38 is HIGH.

Due to this operation, the control circuit 10 applies a HIGH signal to the drive signal input terminal 36 when data is read from the non-volatile memory 6. This causes the data stored in memory cell 46 to be read out from the output terminal 38 with a HIGH level also output from the NOR gate 40 of the reading-completion detector 9. This HIGH level declares that reading is completed, and a HIGH level signal from the output terminal of reading-completion detector 9 thus serves as a read operation completion signal. It therefore follows that a LOW signal at the output of the NOR gate 40 indicates that reading is not completed. As a result, the control circuit 10 can determine whether reading by the sense amplifier unit 7 has been completed by testing the output level of the NOR gate 40 in the reading-completion detector 9.

The process of exchanging data between the IC card 1 and reader/writer 2 is described next with reference to FIG. 3.

Figure 3:
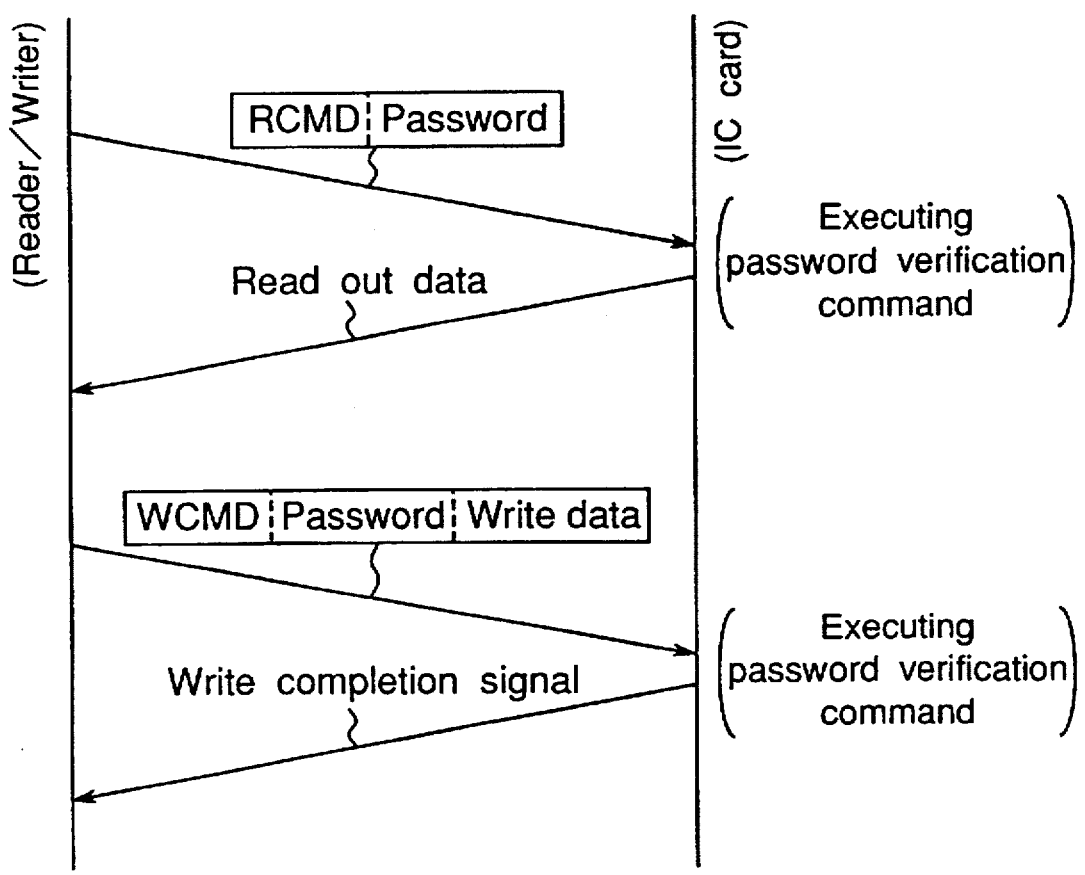
FIG. 3 is used to describe the process of exchanging data between the IC card and reader/writer.

To read data from the IC card 1, the reader/writer 2 sends a read command RCMD followed by password data to the IC card 1 as shown in FIG. 3. The IC card 1 then verifies the password received from the reader/writer 2 against the password stored in the non-volatile memory 6. If the passwords match, the IC card 1 executes the read command RCMD to read and transfer the requested data from the non-volatile memory 6 to the reader/writer 2.

When the reader/writer 2 writes to the IC card 1, the reader/writer 2 similarly sends a write command WCMD, password data, and the data in write in memory to the IC card 1. The IC card 1 again verifies the received password against the stored password in the non-volatile memory 6. If the passwords match, the IC card 1 executes the write command WCMD and stores the write data received from the reader/writer 2 in the non-volatile memory 6, and then sends a write-end signal back to the reader/writer 2.

The read or write command is thus always followed by a password when the reader/writer 2 sends a read or write command to the IC card 1. The IC card 1 then enables reading from or writing to the non-volatile memory 6 as requested by the appropriate command from the reader/writer 2 when the received password matches the authorized password previously stored in the non-volatile memory 6. Note that the process of verifying the received password against the authorized password is accomplished by a password verification unit 50 in the control circuit 10.

Figure 4:
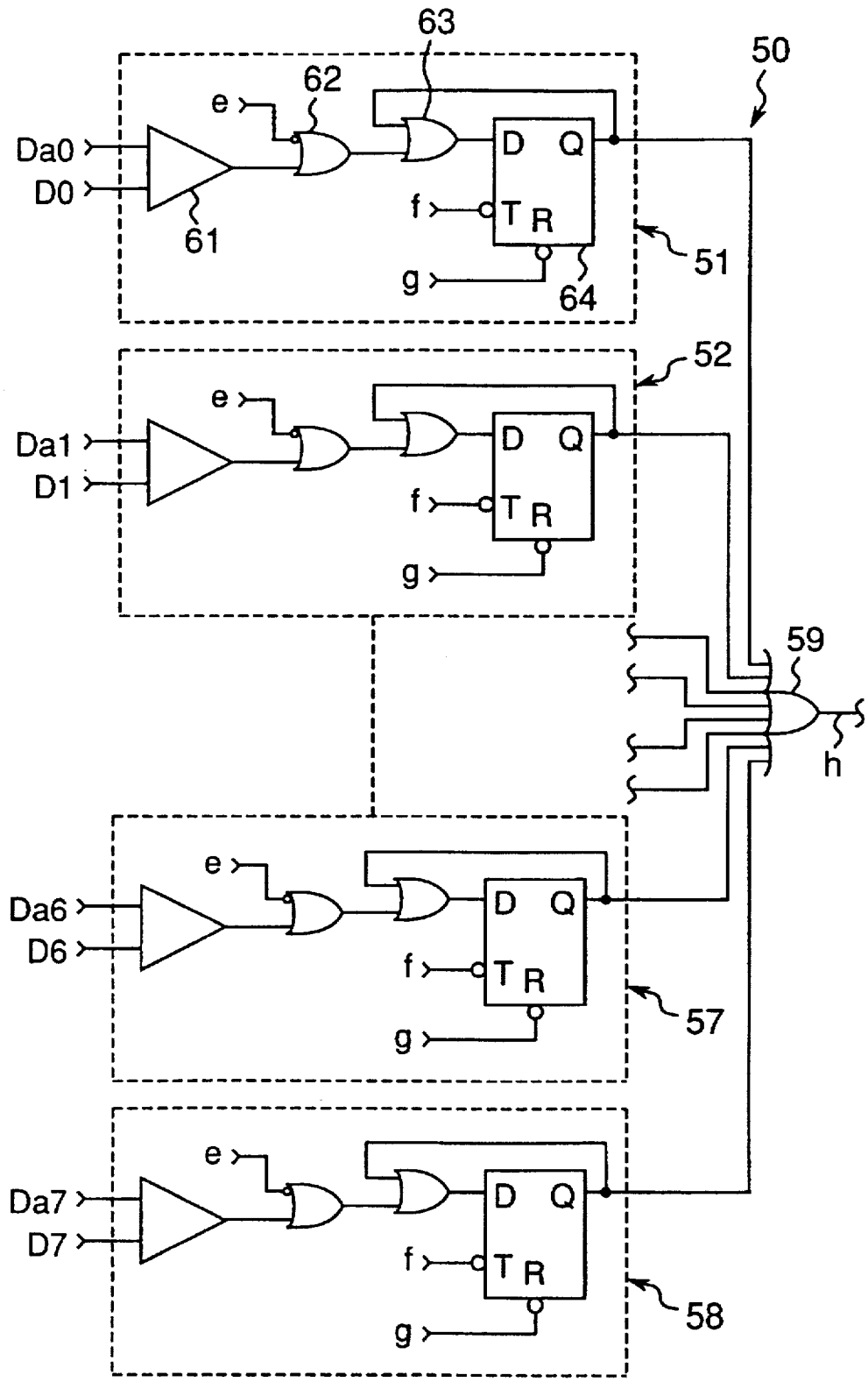
FIG. 4 is a simple circuit diagram of an exemplary password verification unit.

FIG. 4 is a simple circuit diagram of a password verification unit 50 exemplary of the present embodiment. Note that the device shown in FIG. 4 is for non-volatile memory 6 with an 8-bit structure by way of example only.

As shown in FIG. 4, the password verification unit 50 comprises password verification circuits 51 to 58, and an 8-input NOR gate 59. Note that password verification circuits 51 to 58 are all identical in structure, and password verification circuit 51 is therefore described below as exemplary of circuits 51 to 58. Note, further, that password verification circuits 53 to 56 are not shown in FIG. 4.

As shown in FIG. 4, password verification circuit 51 comprises a comparator 61, 2-input NOR gates 62 and 63, and a D flip-flop 64.

One input to NOR gate 62 is an inverting input, and the other is a non-inverting input. The inverting input of the NOR gate 62 is connected to the output of the NOR gate 40 of the sense amplifier unit 7, and the non-inverting input is connected to the output of comparator 61. The output of this NOR gate 62 is connected to one input to NOR gate 63. The other input to NOR gate 63 is connected to the non-inverting output Q of the D flip-flop 64. The output of NOR gate 63 is connected to the D input of the D flip-flop 64.

The clock pulse input T of the D flip-flop 64 is an inverting input to which a read signal is input from the control circuit 10. This read signal indicates that data is being read from the non-volatile memory 6 by going HIGH, in this exemplary embodiment, while data is being read, and going LOW at all other times.

The reset signal input R of the D flip-flop 64 is also an inverting input. A HIGH signal is applied to the reset signal input R by the control circuit 10 during password verification.

The non-inverting output Q of the D flip-flop 64 is also connected to one input of the NOR gate 59.

Note that the signal input to the inverting input of NOR gate 62 is shown as a signal e in FIG. 4, a signal f is shown as the input signal to the clock pulse input T of D flip-flop 64 a signal g as the input to reset signal input R, and a signal h as the output from the NOR gate 59.

One bit of the password data read from the non-volatile memory 6 is input to one input of the comparator 61, and the corresponding bit of the password data received from the reader/writer 2 is applied to the other input of the comparator 61. For example, if the 8-bit password read from the non-volatile memory 6 consists of data bits D0 to D7, and the 8-bit password input from the reader/writer 2 consists of data bits Da0 to Da7, corresponding to bits D0 to D7, then data bit Da0 is input to one input of comparator 61 when data bit D0 is input to the other input of comparator 61. The comparator 61 then compares data bit D0 with data bit Da0, and outputs a HIGH mismatch signal only when the bit values do not match. If the bit values match, the comparator output goes LOW.

Figure 5:
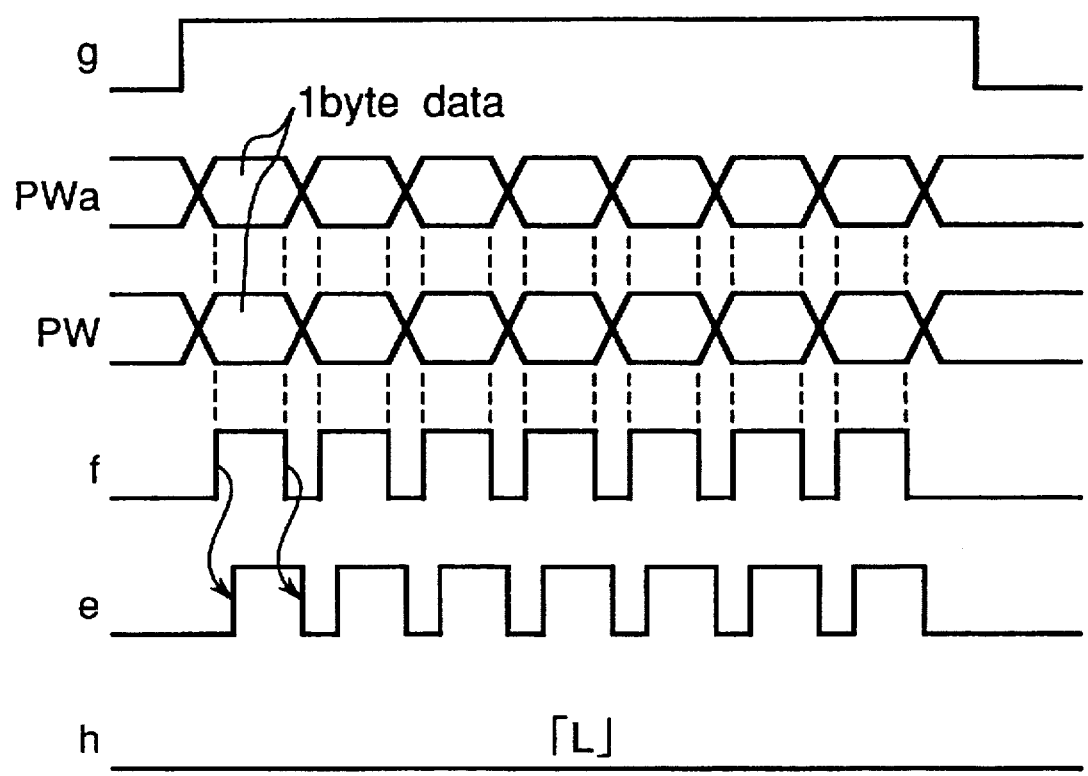
FIG. 5 is a timing chart used to describe the operation of the password verification unit shown in FIG. 4 when the password from the reader/writer matches a stored authorized password.

FIG. 5 is a timing chart of the signal flow through the password verification circuit 51 when the received password matches the authorized password, and is used to describe the operation of the password verification unit 50 below. Note that signal PW in FIG. 5 is the password stored in the non-volatile memory 6, and signal PWa is the password input from the reader/writer 2. Both passwords PW and PWa comprise a plurality of data bytes with one byte comprising eight bits by way of example only. Operation of the password verification unit 50 is described below using a one-byte password PW comprising bits D0 to D7, and a one-byte password PWa comprising bits Da0 to Da7, by way of example only.

When data reading by the sense amplifier unit 7 is completed, the output of NOR gate 40 in the reading-completion detector 9 goes HIGH, and a HIGH signal is thus applied to the inverting input of NOR gate 62. The output level of NOR gate 62 thus changes according to the output level of the comparator 61, i.e., according to the result of the bit comparison accomplished by the comparator 61. If the comparator 61 confirms that the bits match, the comparator output goes LOW, and the output of NOR gate 62 in this case therefore goes LOW.

When the password is read and the clock pulse input T goes HIGH, the non-inverting output Q of D flip-flop 64 goes LOW.

Password data bits D1 to D8 and Da1 to Da8 are likewise compared by the comparators of the corresponding password verification circuits 52 to 58. When the non-inverting output Q of the D flip-flop in each of the password verification circuits 52 to 58 outputs LOW, the output of the NOR gate 59 is LOW. This indicates that the password was verified without a verification error occurring, and the control circuit 10 therefore operates according to the command received from the reader/writer 2 with the password just verified.

When the comparator 61 determines a mismatch between the compared password bits, the comparator 61 outputs HIGH. This causes the NOR gate 62 output to go HIGH, and the non-inverting output Q of the D flip-flop 64 to also go HIGH. The output of the NOR gate 59 therefore also goes HIGH to indicate a password verification error. Because each of the password verification units 51 to 58 are identical, a HIGH output level from the non-inverting output Q of the D flip-flop in any one of the password verification circuits causes the NOR gate 59 output to go HIGH, thus indicating a password verification error.

When a password verification error occurs, the control circuit 10 performs a particular verification error process, such as not executing the read or write command received with the password from the reader/writer 2, and outputs a particular verification error signal to the bus 12 to notify the reader/writer 2 that a verification error occurred.

The verification error signal output to the bus 12 is then converted to serial data by the I/O circuit 5, modulated by the modem circuit 4, and then transmitted by the antenna circuit 3.

It should be noted that the particular verification error process implemented by the control circuit 10 can alternatively be to simply not execute the read or write command received with the password from the reader/writer 2, and to wait for a new command from the reader/writer 2 without outputting a verification error signal to the reader/writer 2.

When data reading by the sense amplifier unit 7 is not completed, the output of the NOR gate 40 in the reading-completion detector 9 is LOW, and the input signal to the inverting input terminal of NOR gate 62 is therefore LOW. The output of NOR gate 62 is therefore HIGH irrespective of the comparison result output by the comparator 61. This causes NOR gate 63 to also output HIGH, and the non-inverting output Q of the D flip-flop 64 to go HIGH. The NOR gate 59 therefore also outputs HIGH as described above, thus indicating a verification error and again causing the control circuit 10 to implement the particular verification error process.

When the supply voltage from the internal power supply circuit 11 drops to a level at which only the sense amplifier unit 7 stops operating, and the control circuit 10 reads the password stored in the non-volatile memory 6 for password verification, a HIGH signal is applied from the control circuit 10 to the drive signal input terminal 36. This causes both nMOS transistors 28 and 29 to be on, and a LOW level to appear at both connection points a and b of sense amplifier 20. The output of NOR gate 40 in the reading-completion detector 9 thus goes LOW, indicating that reading is not completed. As described above, this LOW state causes the control circuit 10 to execute the same verification error process executed when a password mismatch occurs.

It should be further noted that the verification error process implemented by the control circuit 10 as described above prevents execution of the command received with the rejected password from the reader/writer 2, and sets a command wait state in which the control circuit 10 waits for a new command from the reader/writer 2.

It is further possible for the verification error process to stop all control circuit 10 operations until a particular reset operation is performed. This method can be used to even more reliably prevent unauthorized external access to the non-volatile memory 6 of the IC card 1, and thus further improve IC card security.

The output signal of NOR gate 59 can also be used as a reset signal for the control circuit 10. When a verification error occurs and the output of NOR gate 59 goes HIGH, for example, the control circuit 10 is reset. This forces the control circuit 10 to initialize, and thus wait for a new command input. This method makes it even more difficult to determine how the verification error process of the IC card 1 operates, and thus yet further enhances the security of the IC card 1.

The IC card according to the first embodiment of the present invention comprised as described above can thus detect the non-operating status of the sense amplifier unit during password verification by the control circuit 10. More specifically, it can be detected that the sense amplifier unit is not operating because of a drop in the power supply voltage from the internal power supply circuit 11. This makes it possible to detect whether a password previously stored in the non-volatile memory 6 has been normally read. If it is thus detected that a password stored in the non-volatile memory 6 has not been properly read, a particular verification error process can be implemented and unauthorized access to the non-volatile memory 6 prevented.

It is therefore possible to improve IC card security and the confidentiality of data stored in the IC card by preventing improper password verification when the power supply voltage drops to a level at which only the sense amplifier unit does not operate.

EMBODIMENT 2

As described above, the IC card 1 according to the first embodiment of the present invention executes a particular error processing operation and does not perform any password verification when only the sense amplifier unit 7 stops operating because of a drop in the power supply voltage from the internal power supply circuit 11. It is also possible, however, for the operating voltage range of the control circuit 10 to be less than that of the sense amplifier unit 7, i.e., for the sense amplifier unit 7 to operate at a lower voltage level than the lowest operating voltage of the control circuit 10. In this case, the control circuit 10 stops operating before the sense amplifier unit 7 stops operating when the power supply voltage from the internal power supply circuit 11 drops.

An IC card so comprised according to the second embodiment of the present invention is described next below.

Figure 6:
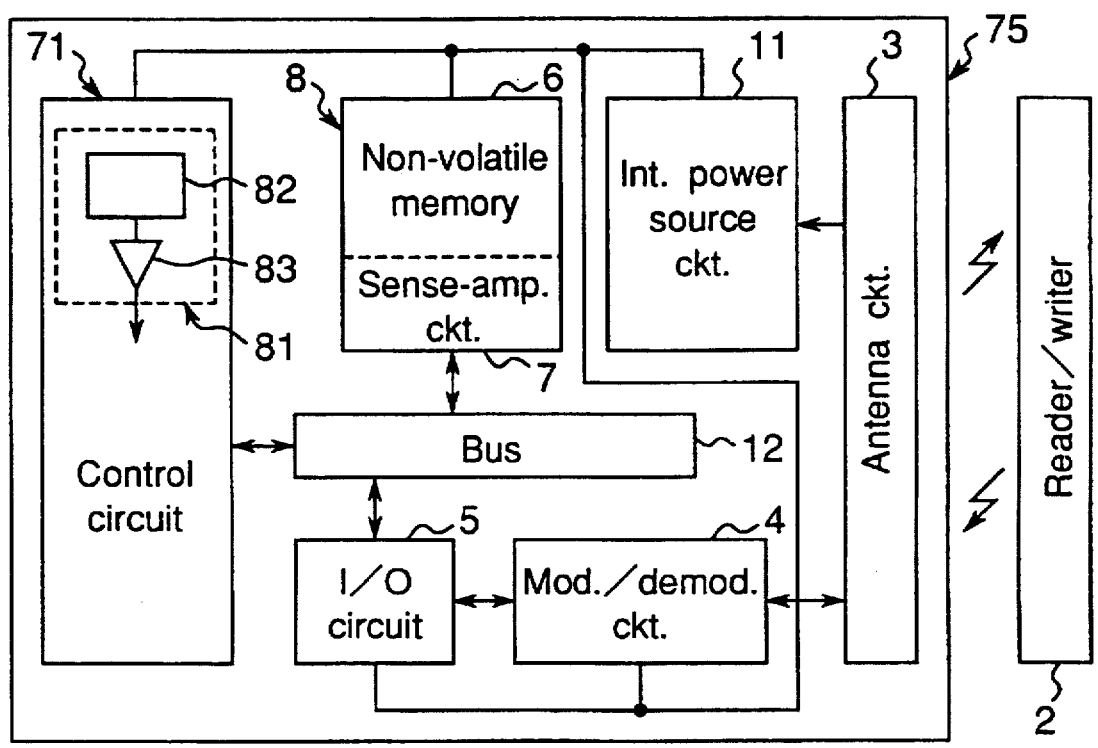
FIG. 6 is a block diagram of an IC card according to a second embodiment of the present invention.
Figure 7:
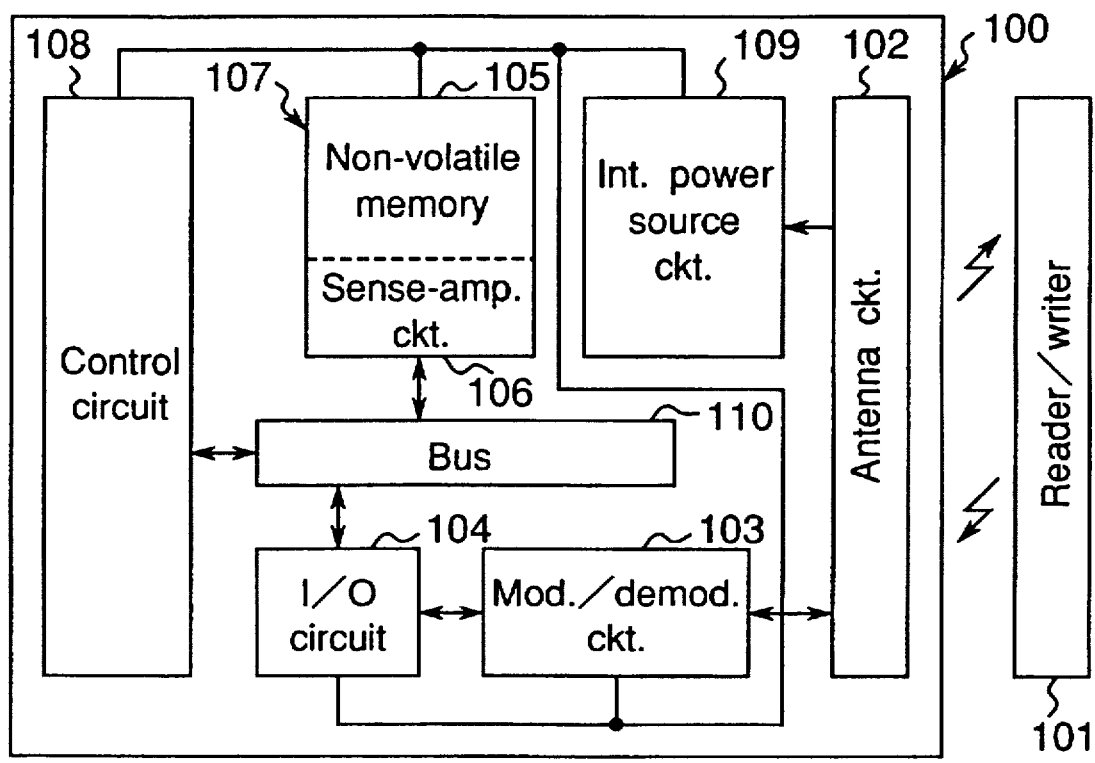
FIG. 7 is a block diagram of a conventional contactless IC card.
Figure 8:
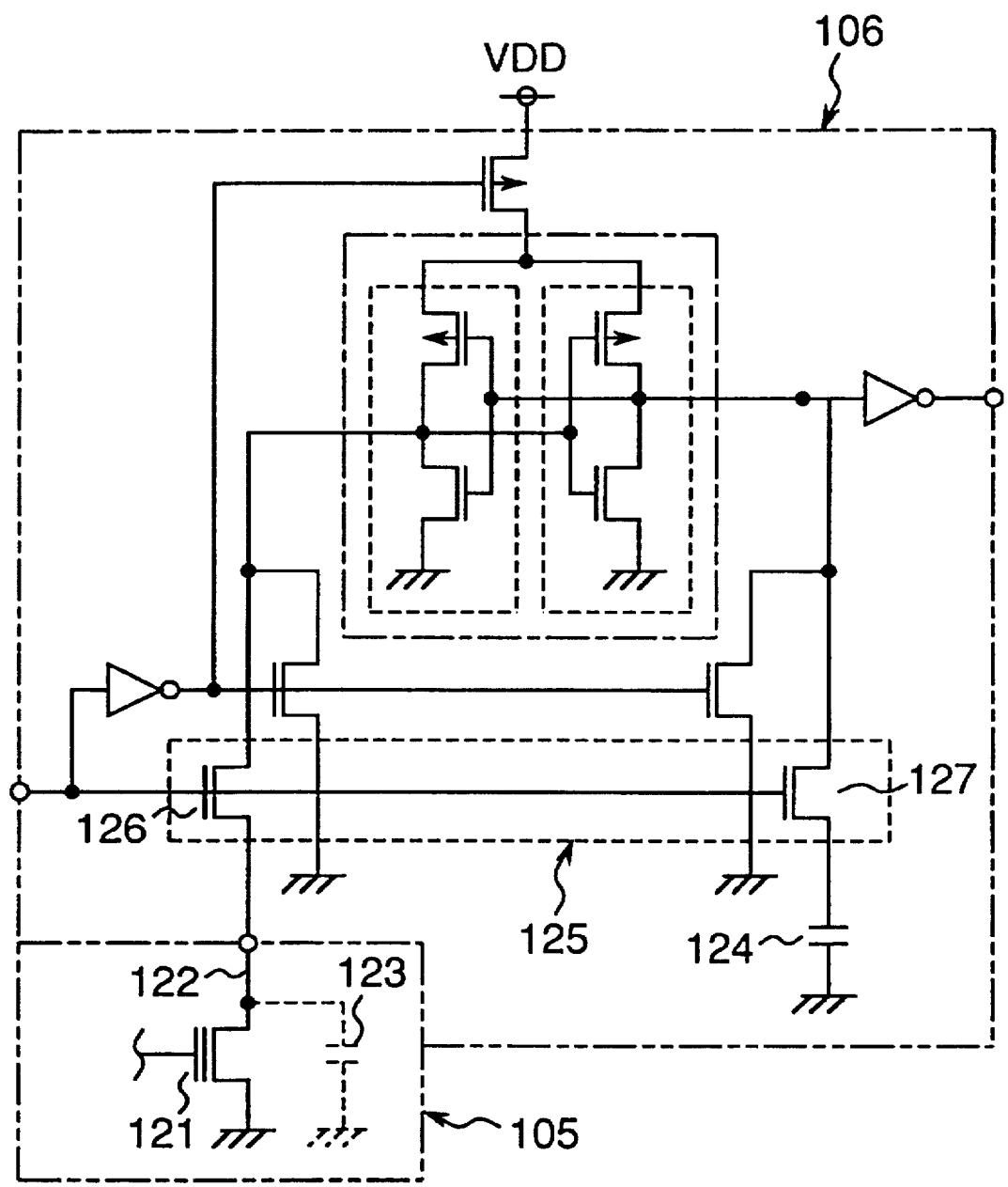
FIG. 8 is a circuit diagram of the sense amplifier unit 106 shown in FIG. 7.

FIG. 6 is a block diagram of an IC card according to a second embodiment of the present invention. Note that like parts are identified by the same reference numbers in FIG. 1 and FIG. 6, and further description thereof is omitted below, where only the differences between the first embodiment shown in FIG. 1 and this second embodiment in FIG. 6 are described.

The IC card shown in FIG. 6 differs from that in FIG. 1 by the elimination of the reading-completion detector 9 and a modification of the control circuit 10. The IC card 75 of this second embodiment thus comprises a control circuit 71 for controlling the I/O circuit 5 and memory unit 8.

The memory unit 8 again comprises a non-volatile memory 6 and sense amplifier unit 7. The IC card 75 further comprises an antenna circuit 3, modem circuit 4, I/O circuit 5, internal power supply circuit 11, and a bus 12 for interconnecting the I/O circuit 5, memory unit 8, and control circuit 71.

The antenna circuit 3 is connected to the modem circuit 4 and internal power supply circuit 11, and the modem circuit 4 is connected to the I/O circuit 5. The internal power supply circuit 11 supplies power to the modem circuit 4, I/O circuit 5, memory unit 8, and control circuit 71.

When data is then sent from the reader/writer 2 to the IC card 75, the control circuit 71 operates according to commands received from the reader/writer 2 to control operation of the memory unit 8. When data stored in the memory unit 8 is sent to the reader/writer 2, the control circuit 71 instructs the memory unit 8 to read out the desired information, and passes the read data via the bus 12 to the I/O circuit 5 as parallel data.

The control circuit 71 comprises a clock generator 81, and operates according to the clock signal supplied by the clock generator 81. The clock generator 81 comprises a clock signal generating circuit 82 for generating a clock signal, and a buffer circuit 83. The clock signal produced by the clock signal generating circuit 82 is supplied to the control circuit 71 through the buffer circuit 83. The control circuit 71 stops operating when clock signal output from the clock generator 81 stops.

The operating voltage range of the control circuit 71 is narrower than that of the sense amplifier unit 7. More specifically, the sense amplifier unit 7 operates at a voltage lower than the lowest operating voltage of the control circuit 71. Even more specifically, the lowest operating voltage of the buffer circuit 83 in the clock generator 81 is higher than the operating voltage of the sense amplifier unit 7. This means that when the power supply voltage from the internal power supply circuit 11 drops, the buffer circuit 83 of the IC card 75 stops operating at the highest power supply voltage level, and the control circuit 71 thus stops operating because the clock signal supply does not pass the buffer circuit 83.

When the control circuit 71 is a microprocessor, it operates according to a program stored in internal mask ROM. The microprocessor therefore stops operating when the mask ROM stops operating, and the control circuit 71 thus stops operating. The operating voltage range of the internal mask ROM of the microprocessor is therefore set to a narrower range than that of the sense amplifier unit 7, i.e., the lowest operating voltage of the internal mask ROM is higher than the operating voltage of the sense amplifier unit 7. As a result, when the voltage of the power supply from the internal power supply circuit 11 drops, the mask ROM of the IC card 75 stops operating at the highest voltage level. This causes the microprocessor to stop operating, and, therefore, the control circuit 71 to stop operating.

As thus described, the operating voltage range of the control circuit 71 in an IC card according to the second embodiment of the present invention is narrower than that of the sense amplifier unit 7 so that the lowest operating voltage of the control circuit 71 is higher than the operating voltage of the sense amplifier unit 7. It is therefore possible to prevent improper password verification when the power supply voltage from the internal power supply circuit 11 drops without the sense amplifier unit 7 only entering into a non-operating state. It is therefore possible to prevent improper password verification resulting from only the sense amplifier unit 7 stopping operation when the power supply voltage drops. IC card security can thus be improved, and the confidentiality of data stored in the IC card can be improved.

It should be noted that while the IC cards of the first and second embodiments of the present invention have been described above with reference to application as contactless IC cards, the invention shall not be so limited, and it will be obvious to those skilled in the art that the invention can also be applied to contact IC cards.

In the case of a contact IC card, the antenna circuit 3 of the contactless IC card is replaced by a connector for electrically connecting to the reader/writer 2, the modem circuit 4 and I/O circuit 5 are replaced by an interface circuit unit for interfacing with the reader/writer 2, the internal power supply circuit 11 is eliminated, and power is supplied directly from the reader/writer 2. In all other respects, however, the structure and operation of the contactless IC cards described above and contact IC cards conforming to the invention are the same, and further description thereof is thus omitted. Note that the connector and interface circuit unit of the contact IC card described above function as the interface unit of the contactless IC cards according to the preceding embodiments.

As described above, the reading-completion detector of an IC card according to the present invention can thus detect if the sense amplifier unit is not operating during password verification by the control circuit, particularly when the sense amplifier unit is not operating due to a drop in the power supply voltage. It is therefore possible to detect whether the password stored in the internal memory unit of the IC card has been correctly read and password verification properly completed. It is therefore possible to implement an appropriate error dection process and to prevent unauthorized access to the memory unit when it is determined that the password stored in the memory unit has not been read normally and completely.

It is, therefore, furthermore possible to prevent improper password verification when the power supply voltage has dropped to a level at which only the sense amplifier unit does not operate. The security of the IC card can thus be improved, and the confidentiality of any data stored to the IC card can be enhanced.

As also described above, the security of the IC card can be yet further improved and the confidentiality of stored data further enhanced by alternatively configuring the control circuit to stop operating and not to be reset until a particular operation is completed when the reading-completion detector does not output the reading-completed signal.

As also described above, the security of the IC card can be even yet further improved and the confidentiality of stored data yet enhanced by reinitializing the control circuit when the reading-completion detector does not output the reading-completed signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card for exchanging data with a data reading and writing device, the IC card comprising:

an interface unit for interfacing with a data reading and writing device, a memory unit comprising a plurality of memory cells for storing data, a sense amplifier unit for reading data from designated memory cells in said memory unit, a reading-completion detection unit for detecting if said sense amplifier unit has completed reading data from said memory unit, and outputting a reading-completion signal indicating that reading has been completed when completion of data reading is detected, and a controller for controlling operation of said memory unit and said sense amplifier unit according to a command input from the data reading and writing device through said interface unit, wherein said controller executes an error indication process when a reading-completion signal is not output from said reading-completion detection unit upon reading data stored in said memory unit.

2. The IC card according to claim 1, wherein said controller stops operating and does not reset until completion of execution of a process when a reading-completion signal is not output from said reading-completion detection unit.

3. The IC card according to claim 1, wherein said controller resets to an initialization state when a reading-completion signal is not output from said reading-completion detection unit.

4. The IC card according to claim 1, wherein said sense amplifier unit comprises a plurality of sense amplifiers, each sense amplifier comprising:

a capacitor with a capacitance greater than a parasitic capacitance of a bit line connected to each memory cell, a current supply unit for simultaneously supplying current to said capacitor and to the bit line connected to each memory cell upon reading data from said memory unit, and a differential amplifier for comparing potential rise in said capacitor to potential rise on a bit line connected to each memory cell and accompanying a current flow from said current supply unit, and verifying the read data from each selected memory cell in response to comparing the potential rises, wherein said reading-completion detection unit outputs a reading-completion signal when the read data is verified by said differential amplifier.

5. An IC card for exchanging data with a data reading and writing device, the IC card comprising:

an interface unit for interfacing with a data reading and writing device, a memory unit comprising a plurality of memory cells for storing data, a sense amplifier unit for reading data from designated memory cells in said memory unit, and a controller for controlling operation of said memory unit and said sense amplifier unit according to a command input from the data reading and writing device through said interface unit, wherein a lowest voltage operating said controller is higher than an operating voltage of said sense amplifier unit.

6. The IC card according to claim 5, wherein said controller comprises a clock generating unit for generating a clock signal, and operating based on the clock signal generated by said clock generating unit, and a lowest voltage operating the clock generating unit is higher than the operating voltage of said sense amplifier unit.

7. The IC card according to claim 5, wherein
said controller includes a microprocessor having a mask ROM, and operating according to a program stored in said mask ROM, and a lowest operating voltage of said mask ROM is higher than an operating voltage of said sense amplifier unit.

* * * * *